United States Patent [19]
Stone

[11] Patent Number: 5,368,018
[45] Date of Patent: *Nov. 29, 1994

[54] BREATHING APPARATUS MOUTHPIECE

[75] Inventor: William C. Stone, Derwood, Md.

[73] Assignee: Cis-Lunar Development Laboratories, Inc., Chadds Ford, Pa.

[*] Notice: The portion of the term of this patent subsequent to Jul. 7, 2009 has been disclaimed.

[21] Appl. No.: 855,675

[22] Filed: Mar. 23, 1992

Related U.S. Application Data

[63] Continuation of Ser. No. 340,250, Apr. 19, 1989, Pat. No. 5,127,398.

[51] Int. Cl.$^5$ ............................................. A62B 18/10
[52] U.S. Cl. ........................ 128/201.28; 128/204.26; 128/205.24
[58] Field of Search ................. 128/201.28, 204.18, 128/204.26, 205.24, 205.28

[56] References Cited

U.S. PATENT DOCUMENTS

| | | | |
|---|---|---|---|
| 3,575,167 | 4/1971 | Michielsen | 128/205.28 |
| 4,273,120 | 6/1981 | Oswell | 128/204.26 |
| 4,446,859 | 5/1984 | Pedersen | 128/204.26 |
| 4,683,881 | 8/1987 | Hansen et al. | 128/204.26 |
| 5,127,398 | 7/1992 | Stone | 128/204.18 |

Primary Examiner—Edgar S. Burr
Assistant Examiner—Aaron J. Lewis
Attorney, Agent, or Firm—Marks & Murase

[57] ABSTRACT

A breathing apparatus mouthpiece which is reversibly switchable between an open circuit and a closed circuit system by rotating a special valve in the mouthpiece. The breathing apparatus mouthpiece is compact, lightweight, easy to operate and has low breathing resistance.

1 Claim, 3 Drawing Sheets

BREATHING APPARATUS MOUTHPIECE

This application is a continuation of application Ser. No. 07/340,250, filed Apr. 19, 1989, now U.S. Pat. No. 5,127,398.

CROSS-REFERENCE TO RELATED APPLICATIONS

Reference is made to applicant's patents describing a breathing apparatus and a breathing apparatus gas routing manifold, U.S. Pat. Nos. 4,964,404 and 4,974,585, respectively.

FIELD OF THE INVENTION

The present invention relates to mouthpiece for a portable life support systems used to sustain human respiration in locations where exposure to the environment would be fatal and in particular where there is a lack of immediate recourse to a safe-haven.

BACKGROUND OF THE INVENTION

Portable life support systems are used in a variety of situations in which the ambient environment around the user cannot be breathed either because of the lack of oxygen in usable form or because of the presence of substances which would have toxic effects if inhaled. These uses include extravehicular activity in space, scuba diving, deep off-shore diving work, use in contaminated atmospheres, use at high altitudes and the like.

The two fundamental architectures in the design of portable life support apparatus are open circuit and closed circuit systems. Open circuit systems, typified by the underwater diving system popularized by Jacques Cousteau, are the simplest, consisting of a compressed gas supply and a demand regulator, or mouthpiece, from which the user breathes. The exhaust gas is ported overboard with each breath, hence the name "open" circuit. These systems are bulky and inefficient in that the oxygen not absorbed during each breath is expelled and wasted. Additionally failure of any component results in failure of the system.

Closed circuit systems, also known as rebreathers, make nearly total use of the oxygen content of the supply gas by removing the carbon dioxide generated by the user, and adding makeup oxygen or oxygen containing gas to the system when the internal volume drops below a set minimum level, or when the oxygen partial pressure drops below some pre-established setpoint.

These closed circuit breathing systems generally consist of a mouthpiece from which the user breathes and which is connected by means of two flexible waterproof hoses, one to remove the exhaled gas and the other to return the processed gas, to a means for removing the carbon dioxide from the breathing gas, replenishing metabolized oxygen, and providing for makeup gas volume with a breathable gas to maintain system volume during descent as the gases within the breathing circuit are compressed. Such devices are usually provided with a series of checkvalves located near the mouthpiece such that gas flow within the breathing circuit is always maintained in a single direction. Oxygen addition to the system may be made by oxygen generators, such as the type disclosed in U.S. Pat. No. 2,710,003, to Hamilton et al., or the addition of oxygen or an oxygen containing gas either through a constant mass flow orifice or by means of a manually operated or a sensor-controlled electronic valve.

The mouthpieces from either an open-circuit or a closed-circuit mode may be combined with other breathing devices or with each other. U.S. Pat. No. 4,304,229 illustrates a mouthpiece which may be switched in a snorkel mode and an open-circuit mode.

The prior art mouthpieces capable of being switched between open and closed circuit modes, such as shown in U.S. Pat. No. 4,273,120, have been complex, bulky devices with high breathing resistance that are difficult to operate.

SUMMARY OF THE INVENTION

The present invention provides a mouthpiece for a mixed gas breathing apparatus which is reversibly switchable between an open circuit and a closed circuit system.

BRIEF DESCRIPTION OF THE DRAWINGS

The invention is further described by way of the illustrative examples with reference to the drawings, in which.

DETAILED DESCRIPTION OF THE INVENTION

Figure 1:
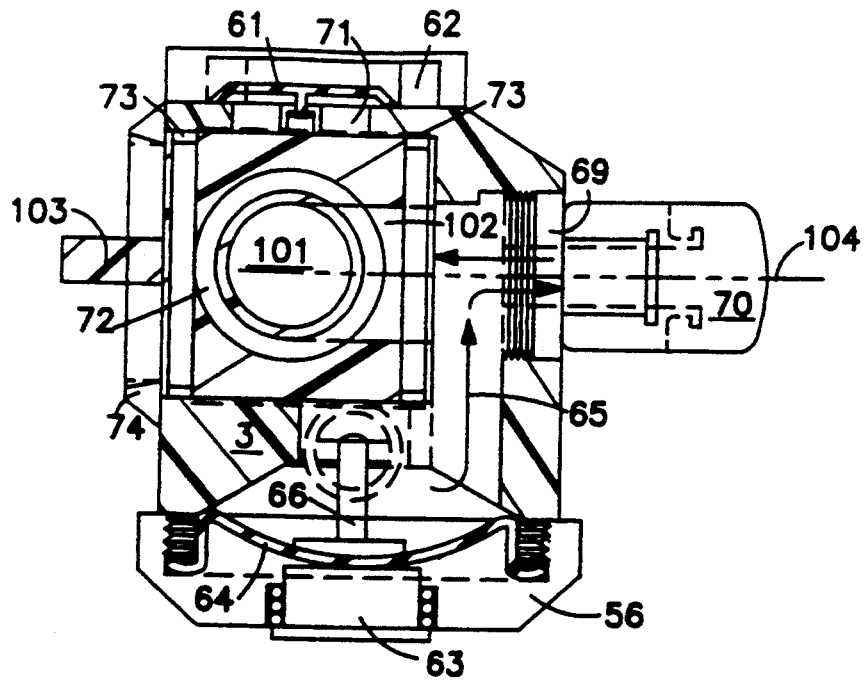
FIG. 1 is a side sectional view of the mouthpiece of the present invention in the closed circuit mode.

The breathing apparatus mouthpiece of the present invention is switchably operable between open and closed circuit modes. The mouthpiece of the present invention may be used in a breathing apparatus of the type which is the subject of my U.S. Pat. No. 4,964,404, entitled BREATHING APPARATUS and U.S. Pat. No. 4,974,585, entitled BREATHING APPARATUS GAS ROUTING MANIFOLD. In accordance with the invention, there is provided a mouthpiece into which the user breathes. The flow of the breathing gas is constrained in a single flow direction by checkvalves on the exhale and inhale sides of mouthpiece. Upon exhalation, the flow is routed by various means, such as hoses and manifolds, into a counterlung or counterlungs and through a carbon dioxide removal system. The cleansed gas is returned to the mouthpiece where it is inhaled by the user.

The diluent gas is a mixture of oxygen and an inert nontoxic gas which may be breathed directly at the desired operating depth of the invention without physiological consequence relating to oxygen toxicity, hypoxia, nitrogen narcosis, or hypercapnia. Diluent gases that may be used include air, helium-oxygen mixtures, nitrox (a mixture of nitrogen and oxygen in proportions other than in air), trimix (a mixture of helium, nitrogen and oxygen), and the like.

In accordance with the present invention there is provided a special valve 68 in mouthpiece 3 which the user may rotate to convert the mouthpiece to function as either a closed circuit breathing manifold or as an open-circuit second stage regulator with no connection to the closed circuit process loop. Provision of a relatively large capacity diluent bottle 24, or an external diluent supply, permits operation of the open-circuit mode for a significant amount of breathing time. This makes possible the safe use of a rebreather or closed circuit system for general sport diving, where significant decompression is generally not a factor and where the open-circuit bailout system would permit a direct, safe ascent to the surface in the event of a failure of the closed-circuit portion of the apparatus.

The mouthpiece is preferably constructed using a monolithic (unitary) housing 3. Fabrication of housing 3 may be made by any means such as machining, injection molding, casting, or the like. Housing 3 provides the equivalent of the body of a conventional open-circuit regulator housing of the type commonly available. The portion of the mouthpiece of the present invention which comprises the open-circuit regulator is located on the bottom of the housing as shown in the drawings.

The open-circuit receptacle is preferably provided with a side port hole through which a second-stage low pressure diluent valve 67 is sealingly fastened. Low pressure diluent gas is supplied preferably from flexible pipe 34 and through adjustable in-line flow control valve 4 which is sealingly fastened to valve 67. The bottom of housing 3 is preferably threaded in such a manner as to permit direct attachment of an existing commercially available second-stage open-circuit regulator cover 56. Cover 56 is preferably equipped with a spring-loaded purge button 63 which, when depressed, contacts flexible diaphragm 64 first, then trigger lever 66, which subsequently opens valve 67 admitting diluent gas into chamber 65. Chamber 65 provides a broad gas path to mouthpiece port 69 and subsequently to the diver through a mouth bit piece 70, which may be made of rubber or the like and which in use is adapted to be inserted into a user's mouth.

The heart of the mouthpiece is a rotating cylindrical valve 68 which fits sealingly into a cylindrically bored hole, the centerline 104 of which is parallel to mouthpiece port 69 and mouth bit piece 70. Valve 68 is preferably comprised of a monolithically machined, injection molded, or cast cylindrical block through which has been bored-a large diameter hole 101 perpendicular to the major axis 104 of the cylinder and parallel to the axis 105 and a second large diameter hole 102 which has been bored into cylinder 68 from the side facing mouthpiece port 69. Bore hole 102 extends only from the side facing mouthpiece port 69 until it intersects perpendicular borehole 101. Bore hole 101 penetrates both sides of cylinder 68 and is advantageously provided with a special conformably mapped o-ring groove and o-ring seal 72 which surround the penetration and yet map to the surface of the cylinder, thereby providing a positive method of sealing the flow of gases which pass through borehole 101 and which will be described in the subsequent operational description of the present invention. Valve 68 also advantageously contains two additional o-ring grooves and accompanying o-ring seals 73 which prevent water or the surrounding atmosphere from entering the housing and prevent breathing gas from escaping through checkvalve 61 in an uncontrolled fashion. Valve 68 is also preferably provided with a projecting tab 103 which permits the user to rotate the valve between the position shown in FIGS. 7 and 8 and the position shown in FIGS. 9 and 10. A retaining cover 74 advantageously prevents valve 68 from being accidentally removed during operation and also provides positive stop positions 107 which permit operation of the valve only in either the closed circuit mode or the open circuit mode.

Figure 2:
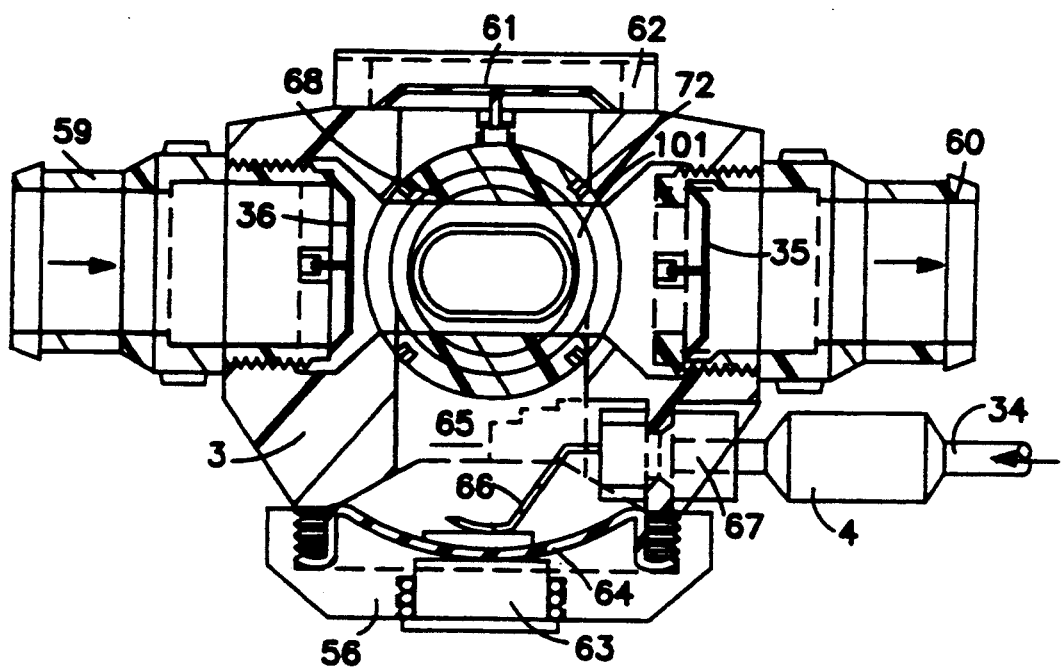
FIG. 2 is a back sectional view of the mouthpiece depicted in FIG. 1.

In FIGS. 1 and 2, valve 68 is shown connecting inhale hose port 59 from the closed-circuit portion of the present invention to the closed-circuit exhale hose or exit port 60 by means of borehole 101. Note that ports 59, 60 and 69 are sealingly connected to housing 3 such that water or the surrounding atmosphere cannot enter the housing. In a similar fashion the closed-circuit flow is accessible to the user by means of borehole 102, mouthpiece port 69 and mouthpiece bit 70. However, the flow path through chamber 65 from the open-circuit portion of the present invention is directly connected to both borehole 102 and mouthpiece port 69 such that, in the event of a significant pressure drop, such as that experienced in diving by complete collapse of the counterlung system upon inspiration as the diver is descending, diaphragm 64 will be drawn upwards thereupon moving lever 66 and triggering diluent addition to the diver through valve 67, as shown by the arrows in FIG. 1. Check valves 36 and 35 are preferably provided to insure that the flow of gas in the closed circuit portion of the apparatus always follows the path shown by the arrows in FIG. 2. FIGS. 1 and 2 comprise the normal operating characteristics and component positions when the present invention is used in closed-circuit mode.

Figure 3:
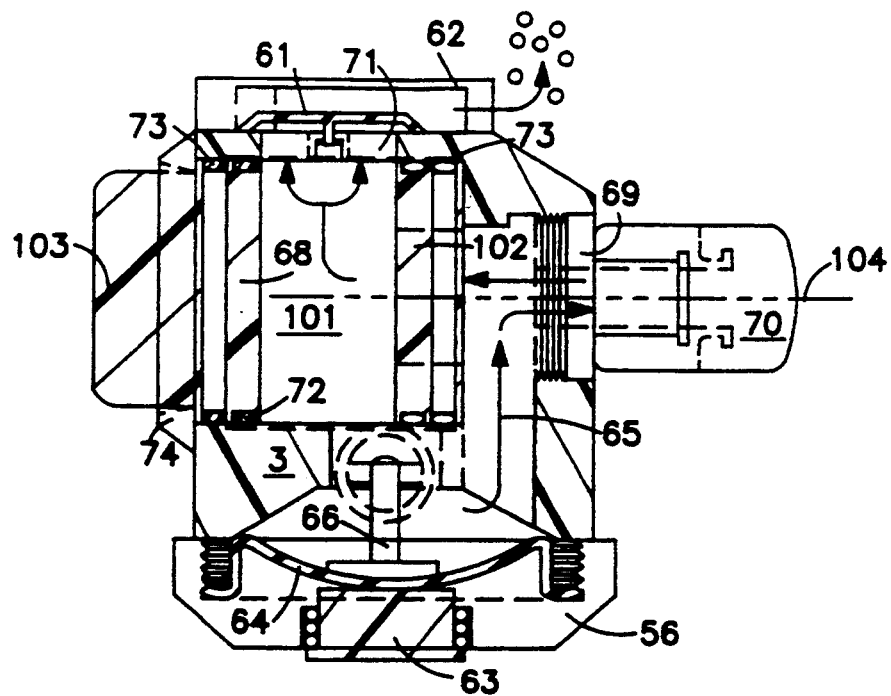
FIG. 3 is a side sectional view of the mouthpiece of the present invention in the open circuit mode.
Figure 4:
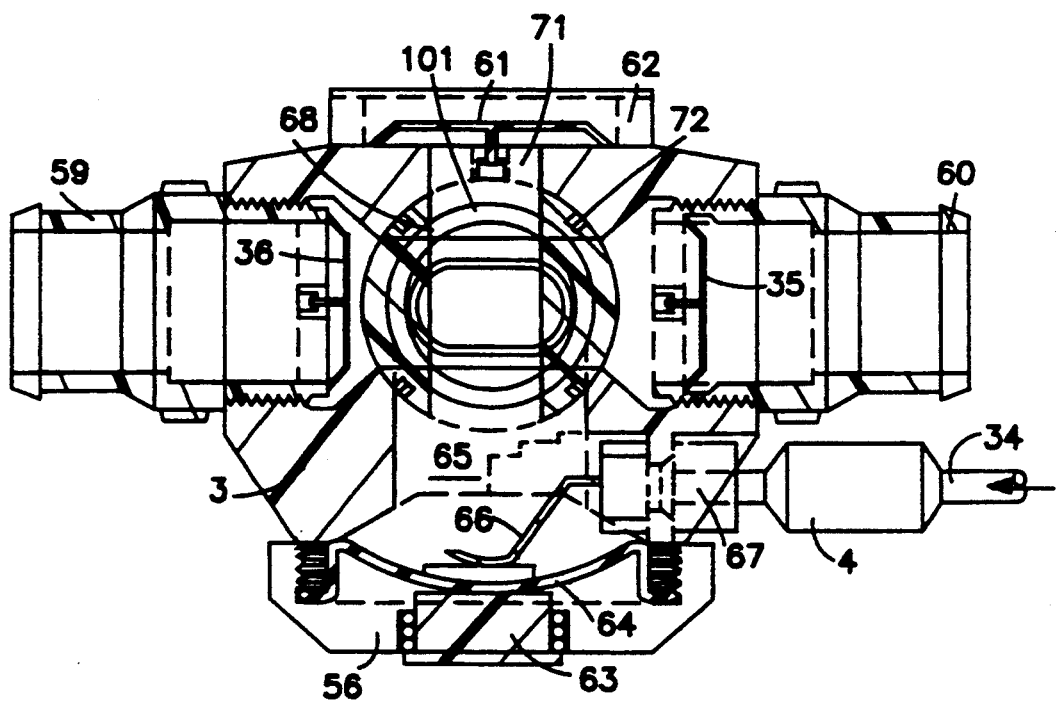
FIG. 4 is a back sectional view of the mouthpiece depicted in FIG. 3.

FIGS. 3 and 4, show valve 68 rotated 90 degrees to the position shown in FIGS. 1 and 2. In this position the present invention now functions as an open-circuit second stage regulator, completely isolated from the closed-circuit portion of the system. Upon inspiration through mouthpiece port 69 diaphragm 66 is drawn upwards whereupon it moves lever 66 which in turn opens valve 67, admitting diluent gas to the user.

Gas released by valve 67 travels up through chandler 65 and through mouthpiece port 69 to the user upon inspiration. Upon exhalation the gas passes through borehole 102, up through borehole 101, through vertical borehole (which functions as an exit port) 71 and subsequently exits into the ambient atmosphere or water through checkvalve 61, as shown by the arrows in FIGS. 3 and 4.

Figure 5:
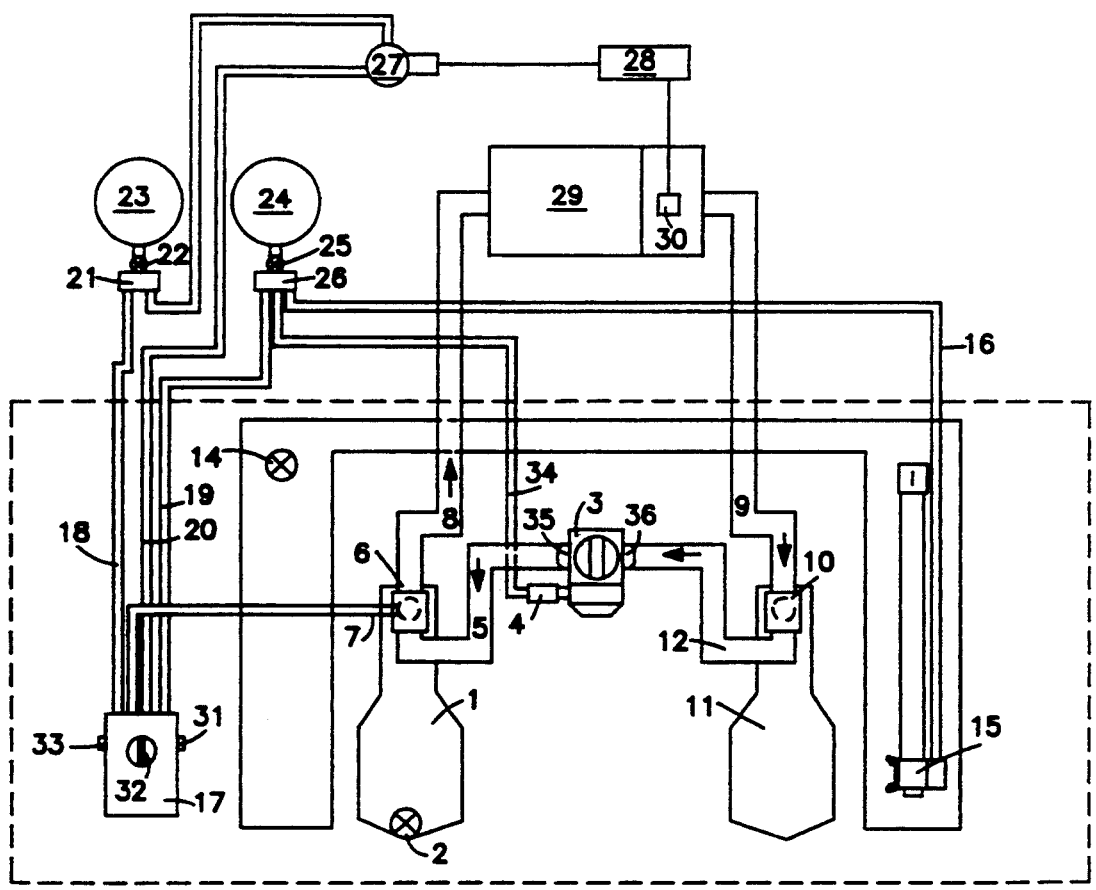
FIG. 5 is a schematic representation of a typical closed circuit breathing apparatus of the type described employing the mouthpiece depicted in FIGS. 1–4.

For emergency use, there is advantageously provided an adjustable, in-line control valve from the low pressure diluent regulator output which permits the user to adjust the pressure drop required to open a second stage open-circuit valve integrated into mouthpiece 3. Adjustable valve 4 is designed such that the flow through feed line 34 shown in FIG. 5 may be completely shut off, thus allowing the diver to stop a free flowing second stage valve in mouthpiece 3 without having to close the high pressure shut-off valve 25. Furthermore, there is advantageously provided an additional low pressure line 19 which connects diluent regulator 26 to the manual override control panel 17. By depressing lever 31 the diver can manually add diluent to the system irrespective of whether or not adjustable valve 4 is closed.

The present invention is a significant improvement over the prior art in many respects. The monolithic housing of the present invention permits all of the necessary mechanical functions to be carried out in an extremely compact space. Furthermore, the large diameter of boreholes 101 and 102, afforded by designing cylindrical valve 68 such that its major axis 104 is aligned parallel with the mouthpiece port, substantially reduces the pressure drop and hence the breathing resistance generally associated with the prior art closed-circuit mouthpieces. Finally, housing 3, and ports 59, 60 and 69 may all be injection molded as a single component, thus significantly reducing fabrication cost and increasing component reliability.

It should be understood that the foregoing disclosure relates only to a preferred embodiment of the invention and that numerous modifications or alterations may be made therein without departing from the spirit and scope of the invention as set forth in the appended claims.

I claim:

1. A mouthpiece assembly for a breathing apparatus, said mouthpiece assembly comprising:

a mouth bit adapted to be inserted into a user's mouth;

means for minimizing the breathing resistance of said mouthpiece assembly comprising a unitary housing communicating directly with said mouth bit by means of a mouthpiece port to thereby minimize the pressure drop between the user and said housing;

an inhalation port for admitting pressurized breathable gas directly into said housing;

a first exit port for exhausting gas from said housing into an ambient environment;

a second exit port for exhausting gas from said housing into a flow channel; and a valve means located in said housing operable to selectively direct the exhaust gas to said first exit port or said second exit port.

* * * * *